United States Patent Office 3,829,419
Patented Aug. 13, 1974

3,829,419
TETRAHYDRO-4H-1,3,5-OXADIAZIN-4-ONE
William David Weir, Levittown, Pa., assignor to Rohm
and Haas Company, Philadelphia, Pa.
No Drawing. Filed Mar. 26, 1973, Ser. No. 344,802
Int. Cl. C07d 87/52
U.S. Cl. 260—244                    1 Claim

ABSTRACT OF THE DISCLOSURE

The novel compound tetrahydro-3-(4-nitrophenyl)-5-(3-pyridylmethyl)-4H-1,3,5-oxadiazin-4-one. It is useful as a rodenticide.

---

The present invention is concerned with the novel compound 3-(4-nitrophenyl)-5 - (3-pyridylmethyl)-2,3,5,6-tetrahydro-4H-1,3,5-oxadiazin-4-one which has the structure.

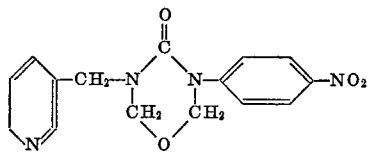

(I)

This compound belongs to a class of compounds which has been called a uron following Kadowaki in Bull. Chem. Soc. Japan 11, 248 (1936). U.S. 3,294,793 described general synthetic procedures for preparing a uron. The most common method appears to be reaction of a urea with some form of anhydrous formaldehyde in the presence of a dehydrating acid such as polyphosphoric acid, surfuric acid or a macroreticular sulfonic acid ion-exchange resin.

The compound of the present invention was made by the following reaction:

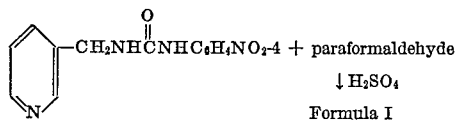

Formula I

The detailed procedure was as follows: (a) a solution of p-nitrophenyl isocyanate (380 g., 2.32 mol) in 4.5 l. of toluene was stirred at room temperature under nitrogen and 3-(aminomethyl)pyridine (250 g., 2.32 mol) was added dropwise.

An exotherm to 40° C. was noted. The resulting thick suspension was stirred overnight and then vacuum filtered. The product was washed with hexane and dried in a vacuum oven at 60° C. overnight to give 610.7 g. melting at 220–221.5° C. Recrystallization from 2-methoxyethanol gave a solid melting with slight decomposition at 223–224° C. The solid was found by analysis to contain 57.1% C, 4.2% H and 20.8% N; calculated for $C_{13}H_{12}N_4O_3$ is 57.3% C, 4.4% H and 20.6% N. The product is a 98% yield of 1-(3-pyridlymethyl)-3-(4-nitrophenyl)-urea. (b) 1-(3-pyridylmethyl)-3-(4-nitrophenyl)-urea (4.1 g., 0.017 mol) and paraformaldehyde (1.52 g., 0.05 mol) were dissolved in 50 ml. of 85% sulfuric acid. The solution was stirred 16 hours at room temperature and was then poured into ice water. While maintaining the temperature of the solution at 20° C. or below, sodium hydroxide was added until the pH was alkaline. Extraction with methylene dichloride gave, upon workup, a yellow oil that soon crystallized. Recrystallization from toluene gave 1.9 g. of light-yellow crystals melting at 112–114° C. The solid was found by analysis to contain 57.0% C, 4.3% H and 17.6% N, calculated for $C_{15}H_{14}N_4O_4$ is 57.3% C, 4.5% H and 17.8% N. The product is a 36% yield of 3-(4-nitrophenyl)-5-(3-pyridylmethyl)-2,3,5,6 - tetrahydro-4H-1,3,5-oxadiazin-4-one.

The compound of the present invention is useful as a rodenticide. It may be formulated into rodenticidal compositions such as baits, tracking powders and sprays. The compound is effective as a one-dose rodenticide and depending on the susceptibility of the rodents to the toxicant and the amount of formulated bait generally consumed, the concentrations can be from as low as 0.05% to almost 100%. A typical bait may contain between 0.5% and 2.5% of the toxicant by weight.

The compound was preliminarily evaluated for its ability to kill albino rats (Rattus norvegicus) by oral administration to two rats at a dosage of 50 mg./kg. The effect on the rats was observed 14 days later. If at least one of the rats had died, the compound was then subjected to a secondary test.

One of the most significant secondary tests is a standard one known as the paired-preference test. In this test the rodents are given a free choice between the treated and untreated bait. Such a test most nearly approximates practical use conditions.

A basal ration was prepared by blending 65 parts of crude ground corn, 25 parts of steel cut oats, 5 parts of powdered sugar and 5 parts of corn oil. The compound was then incorporated into the basal ration in an amount determined by the percentage of active ingredient desired in the bait.

The rodents were caged individually, and were provided with dual feed cups and separate water devices. The basal ration was offered in excess of daily feed requirements in each of two feeders: one treated with the test compound and one without. For each test, equal numbers of each sex were used.

The gross weight of each feed container and its feed were determined daily and returned to the starting weight by addition of complete replacement of the given diet. The position of the bait and the laboratory diet cups in the cage were reversed every 24 hours to counter any feeding position habit of the rat. The test rodents had free choice between treated and untreated feed. Mortalities were recorded daily.

Table I gives the results of representative rodenticide tests with 3-(4-nitrophenyl)-5-(3-pyridylmethyl)-2,3,5,6-tetrahydro-4H-1,3,5-oxadiazin-4-one. The data are given as the number of rodents killed/number of rodents in the test.

TABLE I
[Rodenticidal activity on albino rats]

| Acute oral dose (50 mg./kg.) No. killed/No. tested | Paired-preference tests | |
|---|---|---|
| | Drug level (percent) | No. killed/No. tested |
| 2/2 | 5 | 1/2 |
| | 1 | 1/2 |
| | 0.3 | 0/2 |

The compounds will kill other rodents such as the Norway rat, the albino mouse and the feral mouse (Mus musculus) and the deer mouse (Peromyscus pennsylvanicus).

I claim:
1. The compound 3-(4-nitrophenyl)-5-(3-pyridylmethyl)-2,3,5,6-tetrahydro-4H-1,3,5-oxadiazin-4-one.

References Cited
UNITED STATES PATENTS
3,510,460    5/1970    Fike _____ 260—244

HARRY I. MOATZ, Primary Examiner

U.S. Cl. X.R.
424—248